United States Patent
Mistry et al.

(10) Patent No.: US 6,170,584 B1
(45) Date of Patent: Jan. 9, 2001

(54) TRACKED VEHICLE STEERING SYSTEM WITH STEERING PUMP MONITORING

(75) Inventors: Sanjay Ishvarlal Mistry, Cedar Falls; Yifei Hou, Waterloo; Mark Allen Bergene; Scott Allen Toppin, both of Cedar Falls, all of IA (US)

(73) Assignee: Deere & Company, Moline, IL (US)

( * ) Notice: Under 35 U.S.C. 154(b), the term of this patent shall be extended for 0 days.

(21) Appl. No.: 09/408,369

(22) Filed: Sep. 29, 1999

(51) Int. Cl.[7] .................................................... B62D 11/00

(52) U.S. Cl. ..................... 180/6.44; 180/6.7; 180/9.44; 180/421

(58) Field of Search ..................................... 180/421, 422, 180/423, 446, 6.44, 6.48, 6.7, 9.44; 701/41, 42, 50, 43, 44

(56) References Cited

U.S. PATENT DOCUMENTS

| | | | |
|---|---|---|---|
| Re. 36,151 | * 3/1999 | Ishino et al. | 701/50 |
| 3,914,938 | * 10/1975 | Cornell et al. | 60/395 |
| 4,691,797 | * 9/1987 | Miller | 180/423 |
| 5,390,751 | * 2/1995 | Puetz et al. | 180/6.48 |
| 5,406,860 | * 4/1995 | Easton et al. | 74/335 |
| 5,473,541 | * 12/1995 | Ishino et al. | 364/424.07 |
| 5,535,840 | * 7/1996 | Ishino et al. | 180/6.44 |
| 5,611,405 | * 3/1997 | Ishino et al. | 180/6.44 |
| 5,921,335 | * 7/1999 | Straetker | 180/6.44 |
| 5,948,029 | 9/1999 | Straetker | 701/41 |
| 6,039,132 | * 3/2000 | Easton | 180/6.44 |

OTHER PUBLICATIONS

U.S. application No. 09/053,600.

* cited by examiner

Primary Examiner—Brian L. Johnson
Assistant Examiner—Daniel Yeagley

(57) ABSTRACT

A control system is provided for a tracked vehicle drive/steering system having an engine driven hydraulic steering pump which drives a hydraulic steering motor. The steering pump is responsive to steering control signals representing a status of an operator manipulated steering wheel. The steering motor provides an input to a differential track drive mechanism which responds to manipulation of the steering wheel and drives left and right tracks to turn the vehicle. The control system includes a control unit which receives signals from an engine speed sensor, a steering motor rotation speed and direction sensor, and the steering control signals. The control unit calculates a motor speed threshold value as a function of sensed engine speed and steering control signals, and generates a fault signal as a function of a relationship between the steering motor speed signal and a motor speed threshold value. The control unit generates an overspeed fault signal when the steering motor speed signal is greater than the motor speed threshold value or less than a negative motor speed threshold value, and generates a data conflict fault signal when the steering motor speed signal is less than a negative minimum motor speed threshold value or greater than a minimum motor speed threshold value. The control unit, when the vehicle is not being commanded to turn by the steering control signals, generates a minimum threshold value, and generates an overspeed fault signal when the motor speed signal is greater than the minimum threshold value or is less than a negative minimum threshold value.

6 Claims, 5 Drawing Sheets

TRACKED VEHICLE STEERING SYSTEM WITH STEERING PUMP MONITORING

BACKGROUND OF THE INVENTION

The present invention relates to a tracked vehicle drive/steering system.

Known production tracked vehicles, such as the John Deere 8000T and 9000T series track tractors have a hydrostatic steering system which includes an engine-driven variable displacement steering pump which powers a hydraulic fixed displacement steering motor. The steering motor drives, via a cross shaft and a gear a left planetary drive. The steering motor also drives, via the cross shaft, a gear and a reverser gear, a right planetary drive. A steering control signal is provided by a transducer which detects rotation of a steering wheel. A pump displacement control controls the output of the pump as a function of the steering control signals. The speed and direction of rotation of the steering motor is normally proportional to the position of the steering wheel, and these parameters are sensed by a Hall effect motor speed and direction sensor. The output of the steering system is motor speed, which is measured using a Hall effect motor speed and direction sensor. It would be desirable to have a means of detecting and responding to pump malfunctions wherein the pump output flow exceeds the amount which corresponds to the steering control signal and that which is commanded by the pump displacement control.

SUMMARY OF THE INVENTION

Accordingly, an object of this invention is to provide a system or method of detecting certain failures in a tracked vehicle drive/steering system.

A further object of the invention is to provide such a system which detects when the steering pump output flow exceeds the amount which corresponds to the steering control signal.

These and other objects are achieved by the present invention, wherein a control system is provided for a tracked vehicle drive/steering system having an engine driven hydraulic steering pump which drives a hydraulic steering motor. The pump output flow is measured in terms of the steering motor speed. The steering pump is responsive to steering control signals representing a status of an operator manipulated steering wheel. The steering motor provides an input to a differential track drive mechanism which responds to manipulation of the steering wheel and drives left and right tracks to turn the vehicle. The control system includes a control unit which receives signals from an engine speed sensor, a steering motor rotation speed and direction sensor, and the steering control signals. The control unit calculates a motor speed threshold value as a function of sensed engine speed and steering control signals, and generates a fault signal as a function of a relationship between the steering motor speed signal and the motor speed threshold value. The control unit generates an overspeed fault signal when the steering motor speed signal is greater than the motor speed threshold value, and generates a data conflict fault signal when the steering motor speed signal is less than a negative minimum motor speed threshold value. The control unit, when the vehicle is not being commanded to turn by the steering control signals, generates a minimum threshold value, and generates an overspeed fault signal when the motor speed signal is greater than the minimum threshold value or is less than a negative minimum threshold value.

DESCRIPTION OF THE PREFERRED EMBODIMENTS

Figure 1:
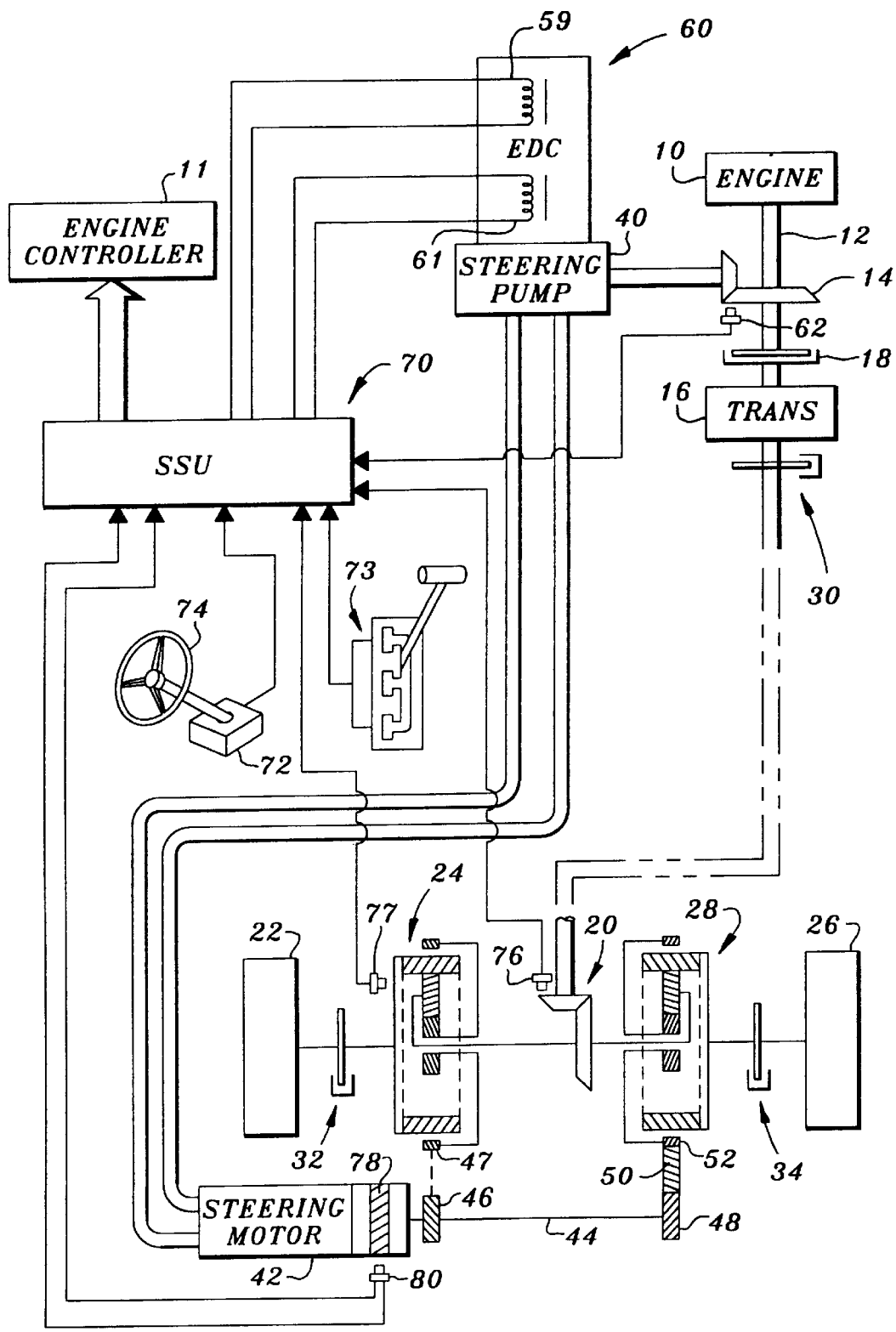
FIG. 1 is a simplified schematic diagram of a tracked vehicle drive and the control system of the present invention.
Figure 2:
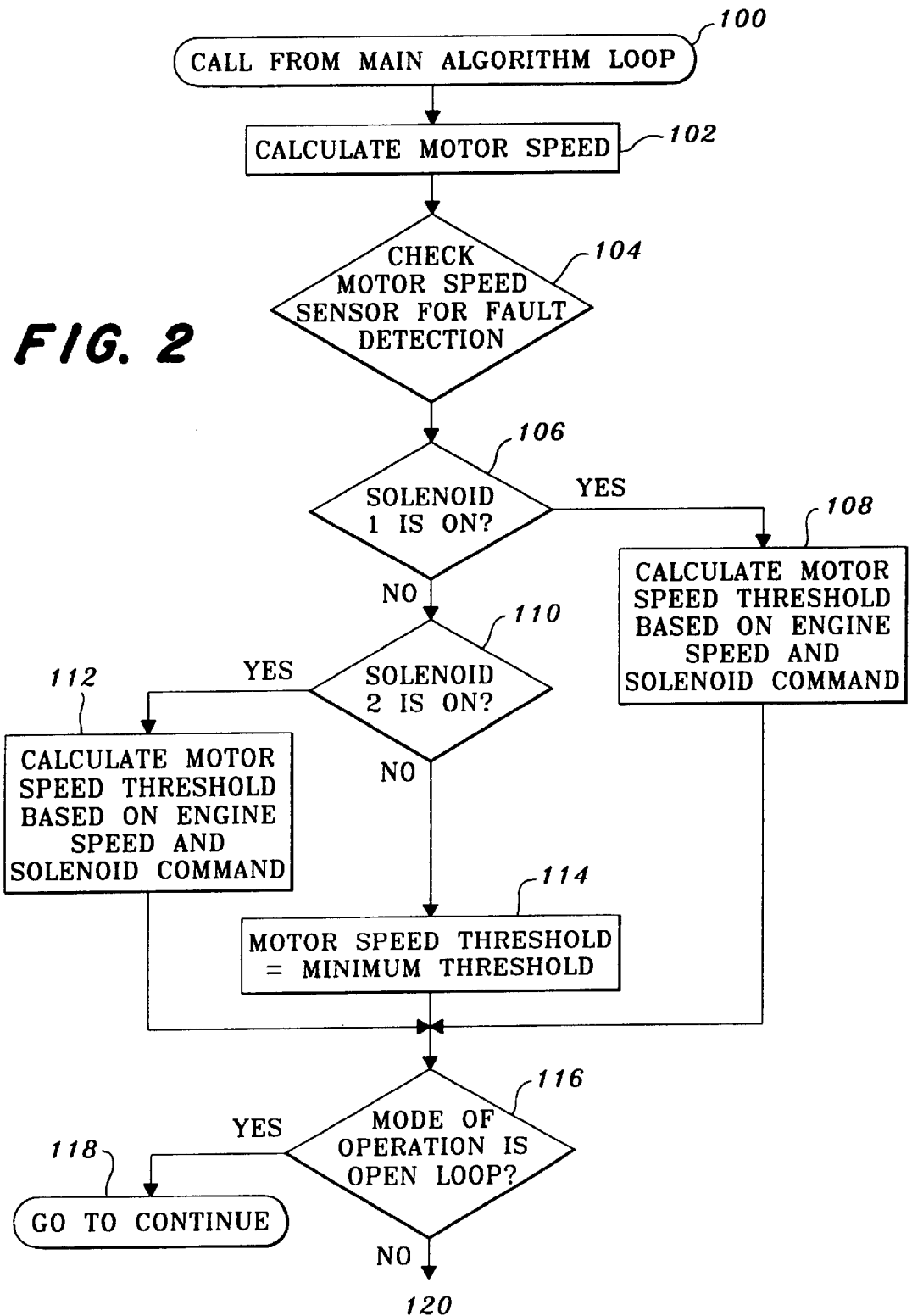
FIGS. 2–5 show a logic flow diagram of an algorithm executed by a microprocessor-based control unit of the control system of FIG. 1.
Figure 3:
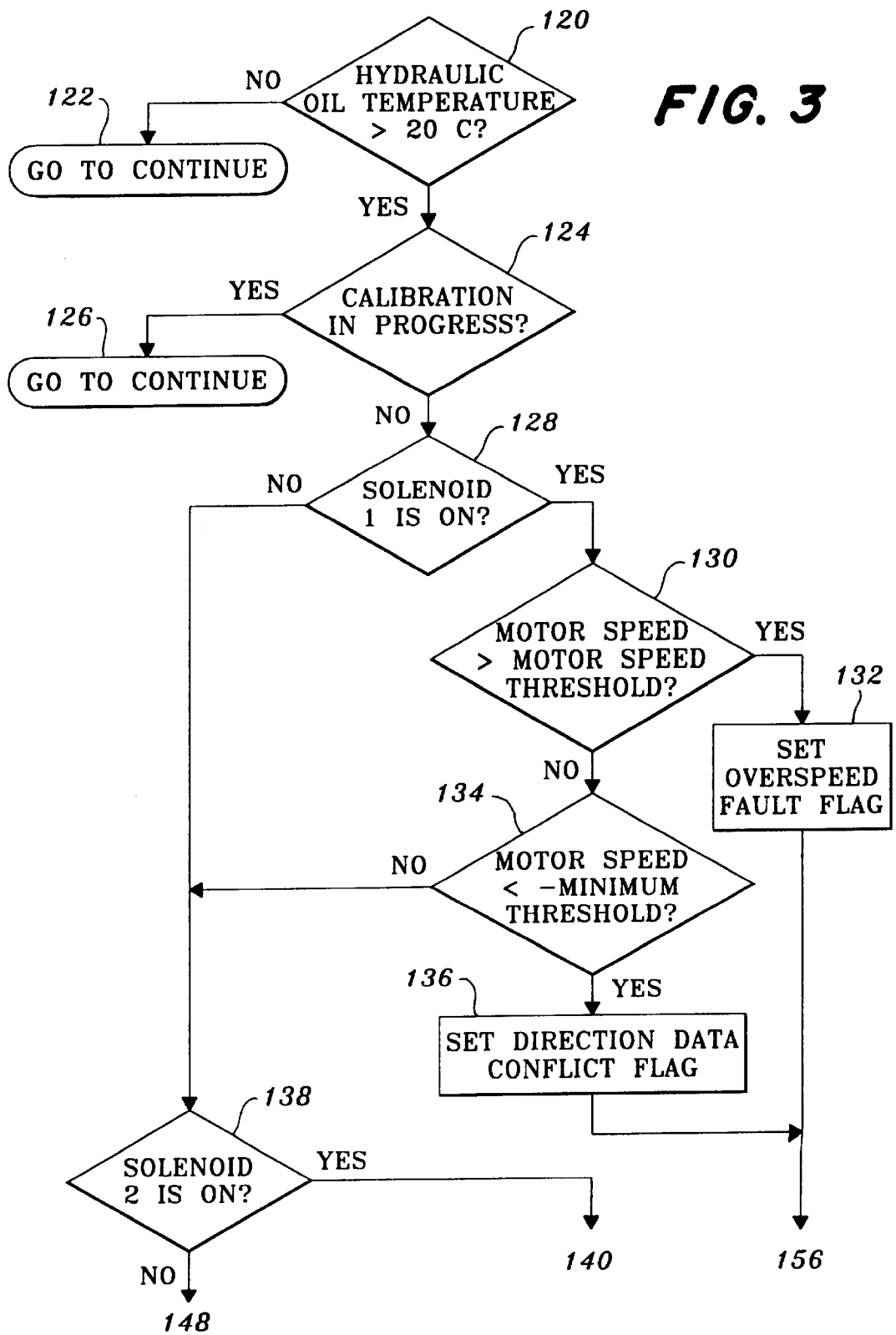
Figure 4:
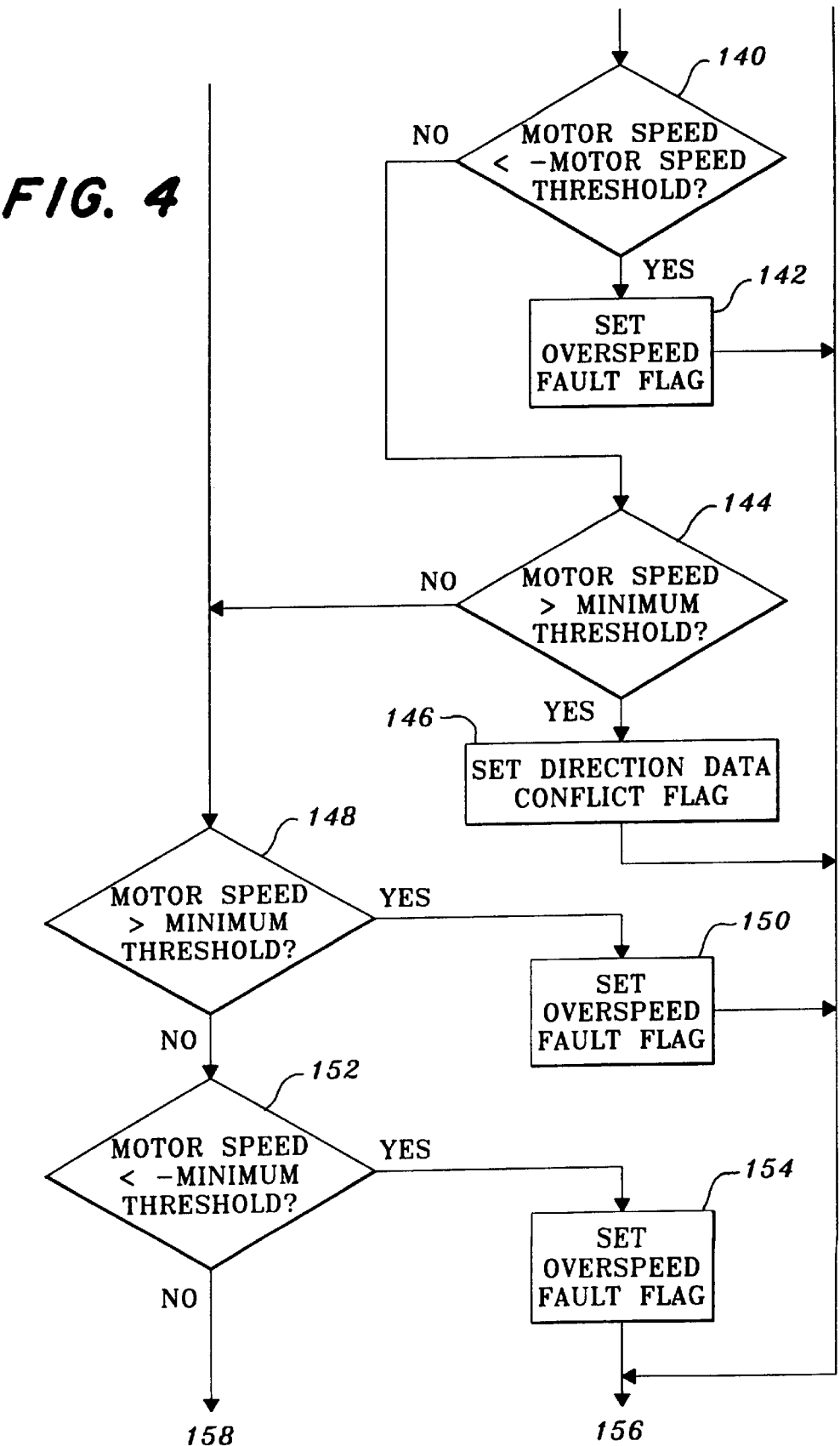
Figure 5:
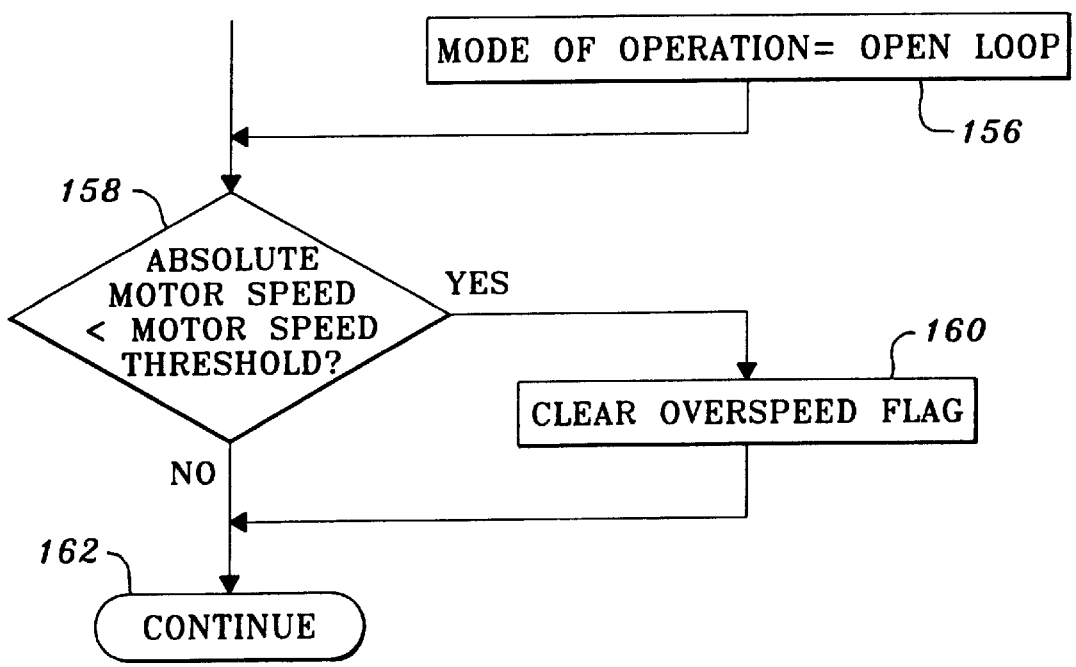

Referring to FIG. 1, an engine 10 of a tracked vehicle has an output shaft 12 which drives a right angle gear 14 and a transmission 16 via a clutch 18. The engine 10 is controlled by an electronic engine control unit 11. The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

A rotation speed sensor 62, such as a commercially available mag pickup, mounted in proximity to the right angle drive 14, provides an engine speed signal to a steering system unit (SSU) 70. The solenoids 59, 61 of valve 60 are controlled by pump command signals (pump_cmd) generated by SSU 70. The SSU 70 is communicated with the engine control unit 11.

A steering wheel rotary position transducer 72, such as a rotary potentiometer, provides to SSU 70 a steering angle signal (steer_angle) representing the position, relative to a centered position, of a spring centered, operator controlled steering wheel 74. This description relates to a steering input device with a spring centered neutral position. The present invention could also be applied to a non-centered steering input device. The SSU 70 also receives signals from gear shift lever transducer 73, such as described in U.S. Pat. No. 5,406,860, issued Apr. 18, 1995 to Easton et al.

A drive line rotation speed sensor 76, preferably a differential Hall-effect speed sensor such as used on production John Deere 8000T tractors, is mounted in proximity to the final drive 20, and provides to the SSU 70 a final drive speed, wheel or vehicle speed signal. A hydraulic oil temperature sensor 77, such as used on the John Deere 8000T tractors, provides to the SSU 70 a hydraulic oil temperature signal. A magnetic ring 78 is mounted for rotation with the motor 42, and a Hall-effect transducer 80 mounted near the magnetic ring 78 provides to the SSU 70 a motor speed signal and a motor direction signal.

The SSU 70 includes a commercially available microprocessor (not shown) which executes a subroutine or algorithm which is illustrated by FIGS. 2–5. This algorithm assumes that steering input device 72 and the motor speed and direction sensor 80 are fully functional. The signal from steering input device 72 is converted to solenoid command value. A Solenoid 1 command represents a right turn of the steering input device when the vehicle is in neutral or forward gear/direction or a left turn while in the reverse gear/direction. A Solenoid 2 command represents a left turn of the steering input device when the vehicle is in neutral or forward gear/direction or a right turn while in reverse gear/direction.

This algorithm depends on correct value of motor speed as well as direction, so if it is sensed that these values are not reliable (not fully functional or faulty as a result of an open circuit or short circuit) then this algorithm/logic is disabled. When it is determined that the motor speed sensor 80 is faulty, then the SSU sets open_loop variable as true. This variable is used to disable the algorithm in case of motor speed sensor fault.

Step 100 is entered when called from a main algorithm loop (not shown) such as executed by SSU of the production 8000T tractor. Step 102 calculates a motor speed value from speed sensor 80. Step 104 checks the motor speed sensor for faults. Step 106 directs the algorithm to step 108 if solenoid 1 is on, else to step 110. Step 108 calculates a motor speed threshold value, and then directs control to step 116. The motor speed threshold is a maximum allowable value of motor speed which should not be exceeded by a normally functioning pump and motor hydrostatic system under normal operating conditions. A motor speed threshold is calculated based on the present engine speed, present solenoid command and a fixed minimum value of motor speed threshold (minimum threshold). A separate motor speed threshold is calculated for solenoid 1 and solenoid 2 command.

Step 110 directs the algorithm to step 112 if solenoid 2 is on, else to step 114. Step 112 calculates a motor speed threshold value as above, and then directs control to step 116.

Step 114 sets motor speed threshold equal to a minimum threshold (if neither solenoid is on).

Step 116 causes an exit from this subroutine via step 118 if the open loop mode is operational, else the algorithm proceeds to step 120.

Step 120 causes an exit from this subroutine via step 122 if hydraulic oil temperature is below 20 degrees centigrade, else the algorithm proceeds to step 124.

Step 124 causes an exit from this subroutine via step 126 if calibration is in progress, else the algorithm proceeds to step 128.

Thus, as a result of steps 116–124, the algorithm checks for and starts working only if the following conditions exist:
if the steering system is not active in open-loop mode (i.e. it is active in closed-loop, that is motor speed and direction sensor is working properly, without any known detectable malfunctions);
and hydraulic oil temperature is more than 20 degree Celsius (Low oil temperature will cause excessive pump response delay in a normal pump. To avoid setting variable delay as well as avoid generating false warnings, the algorithm is deactivated when oil temperature is below a specific oil temperature);
and the tractor is not in calibration mode (the algorithm is disabled when tractor is undergoing calibration).

Step 128 directs the algorithm to step 130 if solenoid 1 is on, else the algorithm proceeds to step 138. Step 130 directs the algorithm to step 132 if motor speed is greater than motor speed threshold, else the algorithm proceeds to step 134. Step 132 sets an overspeed fault flag and directs the algorithm to step 156. Step 134 directs the algorithm to step 136 if motor speed is less than the negative of minimum motor speed threshold, else the algorithm proceeds to step 138. Step 136 sets a direction data conflict flag and directs the algorithm to step 156. Thus, as a result of steps 128–136, if solenoid 1 is ON (that is, tractor is either in neutral or forward gear and is making a right turn, or is in reverse gear and is making a left turn), then if motor speed is greater than motor speed threshold value then set overspeed fault flag (SSU 152), or if motor speed is less than negative of minimum threshold value then set direction data conflict flag (SSU 154).

Step 138 directs the algorithm to step 140 if solenoid 2 is on, else the algorithm proceeds to step 148. Step 140 directs the algorithm to step 142 if motor speed is less than the negative of motor speed threshold, else the algorithm proceeds to step 144. Step 142 sets an overspeed fault flag and directs the algorithm to step 156. Step 144 directs the algorithm to step 146 if motor speed is greater than minimum motor speed threshold, else the algorithm proceeds to step 148. Step 146 sets a direction data conflict flag and directs the algorithm to step 156.

Thus, in steps 138–146, if solenoid 2 is ON (that is, tractor is either in neutral or forward gear and is making a left turn, or is in reverse gear and is making a right turn), then if motor speed is less than negative of motor speed threshold value then an overspeed fault flag (SSU 152) is set, or if motor speed is greater than minimum threshold value, then a direction data conflict flag (SSU 154) is set.

Step 148 directs the algorithm to step 150 if motor speed is greater than a minimum threshold, else the algorithm proceeds to step 152. Step 150 sets an overspeed fault flag and directs the algorithm to step 156. Step 152 directs the algorithm to step 154 if motor speed is less than the negative of minimum threshold, else the algorithm proceeds to step 158. Step 154 sets an overspeed fault flag and directs the algorithm to step 156. Step 156 sets a mode of operation as open loop and directs the algorithm to step 158. Thus, in steps 148–156, if motor speed is greater than minimum threshold value or if motor speed is less than negative of minimum threshold value, then an overspeed fault flag (SSU 152) is set, and the operational mode is set as Open Loop.

Step 158 directs the algorithm to step 160 if absolute motor speed is less than motor speed threshold, else the algorithm exits via step 162. Step 160 clears the overspeed fault flag and exits the algorithm via step 162.

The following is a program listing of the computer program which implements the subroutine illustrated by the flow chart of FIGS. 2–5.

```
Motor Overspeed Warning Logic
/* Calculate Runaway Motor Speed based on SOL1 or SOL2 command.
   /* We are assuming that
        - Steering input device is functional and
        - Motor direction is also functional
      in order to detect this condition. */
if (SOL1)
mot_spd_threshold = ((engine_spd/20)-(min_spd_threshold/100))*(SOL1/10) +
min_spd_threshold;
else if (SOL2)
mot_spd_threshold = ((engine_spd/20)-(min_spd_threshold/100))*(SOL2/10) +
min_spd_threshold;
   else
      mot_spd_threshold = min_spd_threshold;
/* Set fault conditions */
   if ((!open_loop) && (hyd_oil_temp > 84) && (!CALINP))
   {
      if(SOL1)
      {
         if (mot_spd1 > mot_spd_threshold)
            mspd_cnt_ra |= sfmask;         /* Set SSU 152 fault */
         if (mot_spd1 <-min_spd_threshold)
            mdir_cnt_DC |= sfmask;         /* Set SSU 154 fault */
      }
      else if (SOL2)
      {
         if (mot_spd1 <-mot_spd_threshold)
            mspd_cnt_ra |= sfmask;         /* Set SSU 152 fault */
         if (mot_spd1 > min_spd_threshold)
            mdir_cnt_DC |= sfmask;         /* Set SSU 154 fault */
      }
      else
      {
         if ((mot_spd1 > min_spd_threshold) || (mot_spd1 <-
min_spd_threshold))
            mspd_cnt_ra |= sfmask;         /* Set SSU 152 fault */
      }
      if (abs(mot_spd1) < mot_spd_threshold)
         mspd_cnt_ra &= clr_sfmask;        /* Clear SSU 152 fault */
   }
```

End of Motor Overspeed Detection Logic

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a tracked vehicle drive/steering system having an engine driven hydraulic steering pump which drives a hydraulic steering motor, the steering pump being responsive to steering control signals representing a status of an operator manipulated steering wheel, the steering motor providing an input to a differential track drive mechanism which responds to manipulation of the steering wheel and turns the vehicle and drives left and right tracks, the control system comprising:

an engine speed sensor;
a steering motor rotation speed sensor for generating a steering motor speed signal; and
a control unit receiving the steering control signals and coupled to the engine speed sensor and the steering motor speed sensor, the control unit calculating a motor speed threshold value as a function of sensed engine speed and steering control signals, and generating a fault signal as a function of a relationship between the steering motor speed signal and a motor speed threshold value.

2. The control system of claim 1, wherein:

the control unit generates an overspeed fault signal when the steering motor speed signal is greater than the motor speed threshold value.

3. The control system of claim 1, wherein:

the control unit generates a direction data conflict fault signal when the steering motor speed signal is less than a negative minimum motor speed threshold value.

4. The control system of claim 1, wherein:

the control unit generates an overspeed fault signal when the steering motor speed signal is less than a negative motor speed threshold value.

5. The control system of claim 1, wherein:

the control unit generates a direction data conflict fault signal when the steering motor speed signal is greater than a minimum motor speed threshold value.

6. The control system of claim 1, wherein:

the steering motor rotation speed sensor generating a steering motor speed signal and a motor direction signal; and the control unit, when the vehicle is not being commanded to turn by the steering control signals, generating a minimum threshold value, and generating an overspeed fault signal when the motor speed signal is greater than the minimum threshold value or is less than a negative minimum threshold value.

* * * * *